United States Patent [19]

Mitani et al.

[11] Patent Number: 4,620,273

[45] Date of Patent: Oct. 28, 1986

[54] TERMINAL CONTROL SYSTEM AND METHOD OF TERMINAL CONTROL

[75] Inventors: Katsuya Mitani; Toshihirō Sanō; Nobutaka Nomura; Kou Numata; Megumi Utinō, all of Hadano, Japan

[73] Assignee: Hitachi, Ltd., Tokyo, Japan

[21] Appl. No.: 356,922

[22] Filed: Mar. 10, 1982

[30] Foreign Application Priority Data

Mar. 13, 1981 [JP] Japan .................................. 56-35334

[51] Int. Cl.⁴ .............................................. G06F 15/46
[52] U.S. Cl. ................................................. 364/136
[58] Field of Search ........ 364/188, 136, 200 MS File, 364/900 MS File

[56] References Cited

U.S. PATENT DOCUMENTS

| | | | |
|---|---|---|---|
| 4,354,226 | 10/1982 | Flickinger et al. | 364/200 |
| 4,363,108 | 12/1982 | Lange et al. | 364/900 |
| 4,403,303 | 9/1983 | Howes et al. | 364/900 |
| 4,430,728 | 2/1984 | Beitel et al. | 364/900 |
| 4,439,837 | 3/1984 | Aiena et al. | 364/900 |
| 4,486,828 | 12/1984 | Kitamura et al. | 364/200 |

Primary Examiner—Gareth D. Shaw
Assistant Examiner—John G. Mills
Attorney, Agent, or Firm—Antonelli, Terry & Wands

[57] ABSTRACT

A terminal control system comprises a control equipment and a plurality of terminals. The processing program held in the control equipment is loaded to each terminal which performs data processing in accordance with the loaded program. Each terminal has a memory for storing modification data for modifying the program to a program having another function. The processing program loaded to a terminal from the control equipment is thus modified to another kind of program by the modification data to provide the terminal with another function. The original function of a terminal is thus capable of being modified or improved by this modification program.

26 Claims, 7 Drawing Figures

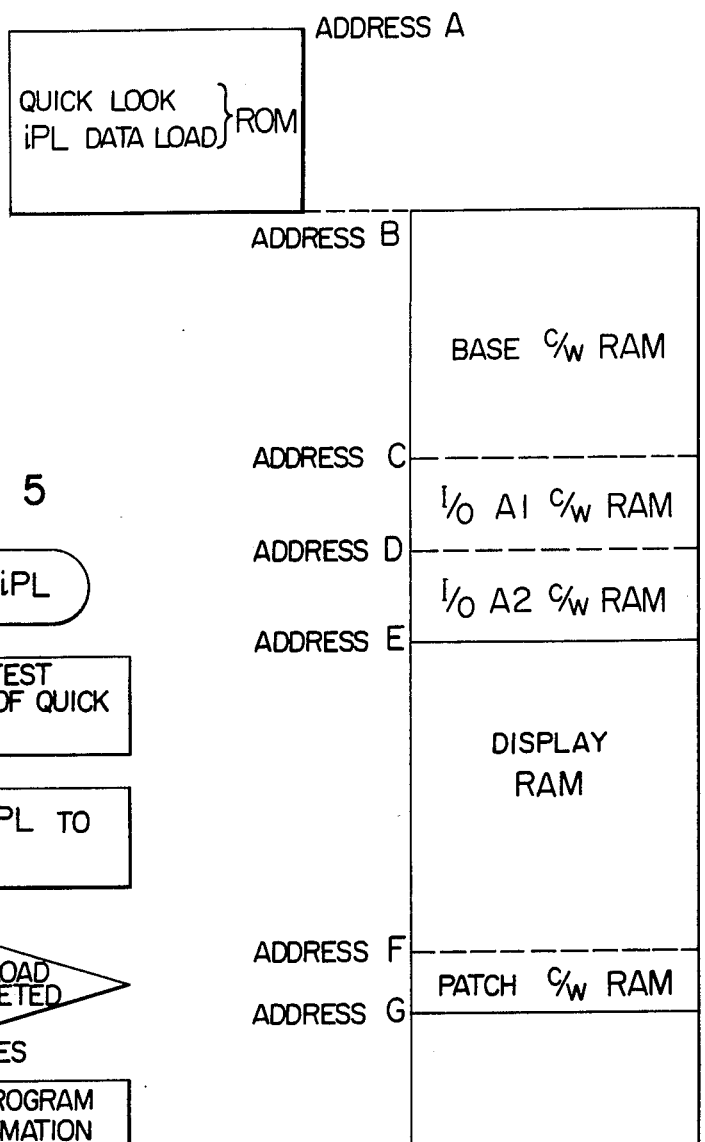

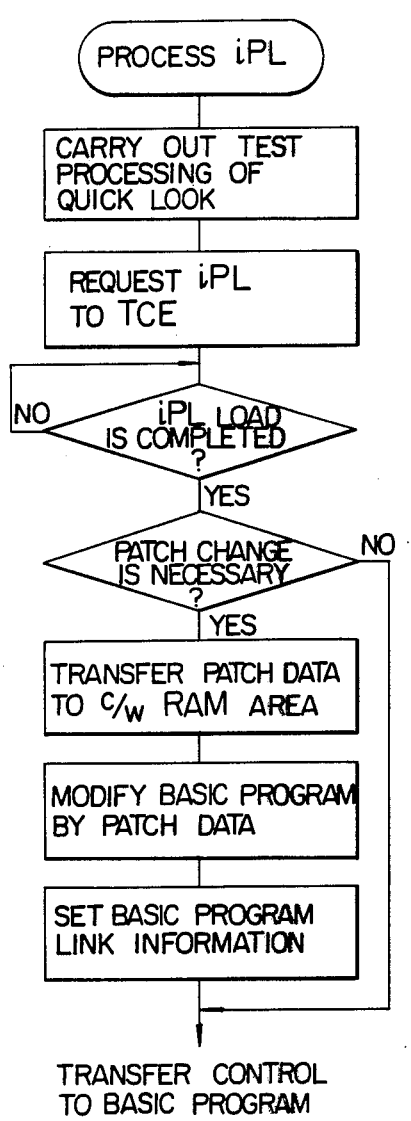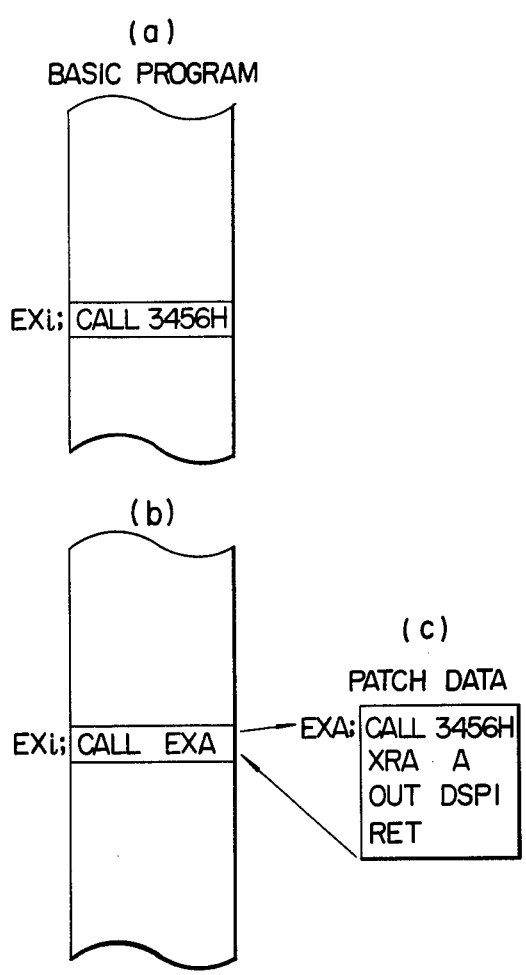

TERMINAL CONTROL SYSTEM AND METHOD OF TERMINAL CONTROL

The present invention relates to a method for controlling terminals, and more in particular to a method for controlling terminals in a system comprising a control equipment and a plurality of terminals connected thereto, wherein the program held in the control equipment is loaded in the terminals for data processing.

A terminal processing system with a plurality of terminals connected to a terminal control equipment is known. The terminals have well-known input-output devices such as a printer, a CRT display and a keyboard. The input-output data to these devices are generally processed at the terminals or the terminal control equipment. At each terminal, data is processed by the input-output data processing program held by the terminal or by a wired logic constructed as hardware. In such a method, various processing functions are provided to the terminals beforehand. In the case where a terminal is provided with sophisticated functions, the quantity of hardware and program of the terminal increase, resulting in a bulky and high-cost system.

The recent technological development of microcomputers and memories has made it possible to provide a terminal with sophisticated processing functions with a low-cost, compact construction. Each terminal is equipped with a RAM (random access memory) which is of a large-capacity and comparatively low in cost, while the control equipment for controlling the terminals has various programs and processing functions therefor. In conducting data processing for input/output at a given terminal, a required program is loaded on the terminal from the control equipment and stored in the RAM, and by the control of the program input/output data is processed by the microcomputer.

Normally, the control equipment is provided with a processing program for each type of terminal, with the same processing program being loaded for the same kind of terminals. In the terminals of the same kind, however, there may occur a case in which the function of a given terminal is required to be improved by changing the processing program. Otherwise, if the function remained the same, a change of the system or specification of the terminal might cause an interface failure between the hardware and the processing program, thus necessitating the modification of the interface. In such a case, the program loaded to the terminal is unavoidably changed.

It is, therefore, an object of the present invention to provide a method of controlling terminals, in a terminal processing system in which a process program which the control equipment holds is loaded to a terminal to carry out some kind of data processing, for allowing terminals to have other kinds of functions without changing programs to be loaded.

Another object of the present invention is to provide a method of controlling terminal, in which the program loaded from the control equipment is modified by conversion data at a terminal, and data is processed by the modified program.

The present invention is realized by a terminal processing system comprising a control equipment having a terminal control program and a plurality of terminals connected with the control equipment for conducting data processing by a program from the control equipment. Terminals include a plurality of devices such as a CRT display, a printer and a keyboard and are loaded with a specific program from the control equipment, thus, performing input/output data processing for the devices. Some terminals have a memory for storing conversion data for converting a kind of processing program loaded from the control equipment into a program for another function. When a certain kind of processing program is loaded to this terminal from the control equipment, the processing program is converted into another kind of program by the conversion data, so that the data inputoutput processing is conducted according to the converted program.

In this way, by converting a certain kind of program into another type of program by a conversion data, a given terminal is provided with a different function.

The present invention will be apparent from the following detailed description taken in conjunction with the accompanying drawings, in which:

FIG. 4 is a diagram showing a memory map;

FIG. 5 shows a flowchart of an initial program load to a first terminal;

FIG. 6 is a diagram showing a flowchart of an initial program load to a second terminal; and FIGS. 7a, 7b and 7c are diagrams for explaining the modification of a basic program.

FIG. 1 shows a block diagram of a terminal processing system to which an embodiment of the present invention is applied. In this system, a terminal control equipment (hereinafter referred to as TCE) 100 is connected with a plurality of terminals 201 and 202.

Figure 1:
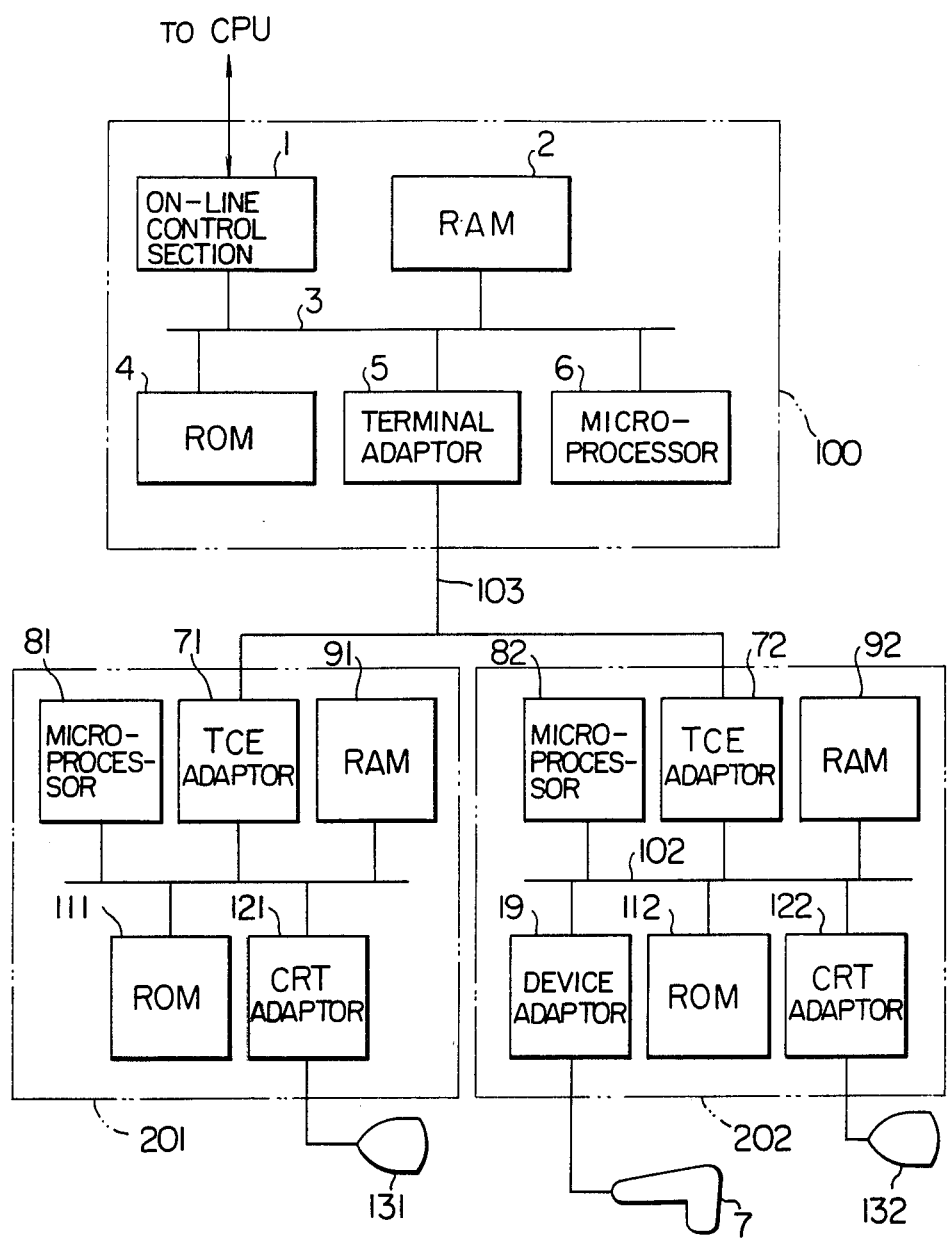
FIG. 1 is a block diagram showing a terminal system for explaining an embodiment of the present invention.

In the TCE 100, a data bus 3 is connected with an on-line control section 1, a random access memory (RAM) 2, a read-only memory (ROM) 4, a terminal adaptor 5 and a microprocessor 6. The on-line control section 1 is connected to a central processing unit (not shown) through, say, a communication line for carrying out communication control of data transferred between the on-line control section 1 and the central processing unit. The RAM 2 is a memory which is capable of being read or written, and temporarily stores the data transmitted from the central processing unit or the data transmitted from the terminals 201 and 202 and the data to be transmitted to the central processing unit or the terminals 201 and 202. The ROM 4 stores an iPL (initial program load) for the terminals 201 and 202, a microprogram for terminal control and a plurality of patch data for function change or addition. The terminal adaptor 5 is connected with a plurality of terminals 201 and 202 in daisy chain. The microprocessor 6 processes the data transmitted from the central processing unit and the terminals 201 and 202. Especially when the terminals 201 and 202 have a character display unit, e.g., a CRT character display, the microprocessor carries out data processing for editing the picture to be transmitted to the character display unit of the terminals 201 and 202.

At terminal 201, on the other hand, the data bus 101 is connected with a TCE adaptor 71, a microprocessor 81, a RAM 91, a ROM 111 and a CRT adaptor 121. The TCE adaptor 71 is connected to the terminal adaptor 5 through an I/O cable 103. The microprocessor 81 carries out various controls and data processing at the terminal 201. For example, the microprocessor carries out the control for fetching the picture data transmitted from the TCE 100 into the RAM 91 corresponding to the picture to be displayed or the control for sequentially reading the display data from the random access memory 91 and transmitting the data to the CRT 131. The RAM 91 stores the picture data transmitted from the TCE 100, and the RAM 91 stores also the iPL data transmitted from the TCE 100 and the microprogram for device control for display on the CRT 131. Also, in the case where the terminal 201 is equipped with an input device, the input data is temporarily stored in the RAM 91. The RAM 111, on the other hand, stores, e.g., an initial test program after throw in of power for the terminal 201 and a program for loading the iPL data from the TCE 100. The CRT adaptor 121 is connected with a well-known CRT 131. Normally, one terminal is connected a plurality of devices including a CRT display, a keyboard, a printer etc. Thus it is general that a plurality of adaptors are provided for connection of devices.

Next, with reference to the terminal 202, a data bus 102 is connected with a microprocessor 82, a TCE adaptor 72, a RAM 92, a RAM 112 and a CRT adaptor 122 for connecting the CRT 132. The construction of the terminal 202 as stated up to now is the same as that of the terminal 201. The terminal 202, however, further includes a device adaptor 19, to which an optical hand reader (OHR) 7 is connected for reading. The OHR reads, e.g., a bar code optically. The terminal 202 is thus considered partially different in functions as compared with the terminal 201 by the addition of the OHR 7.

Figure 2:
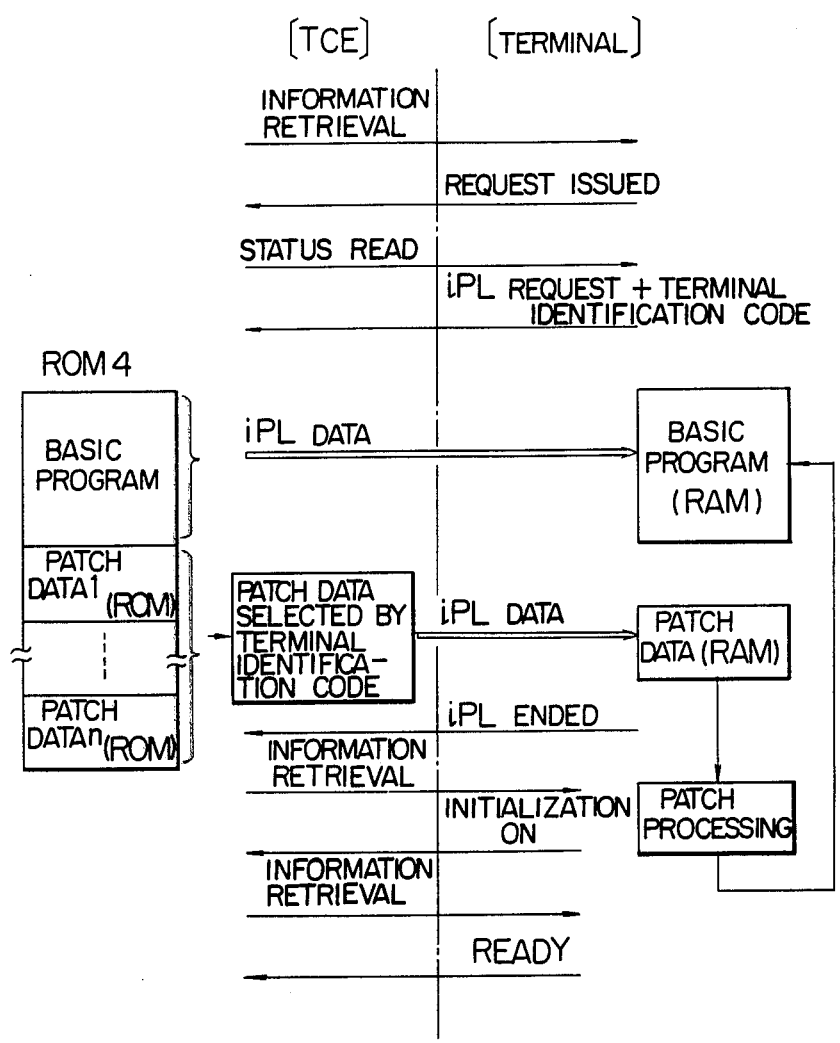
FIG. 2 is a diagram showing the sequence of data transmission between a terminal control equipment and a terminal.

Now, referring to FIG. 2, explanation will be made of the sequence of data transmission between the TCE and terminals. This sequence of data transmission does not differ especially when the terminal differs, i.e., whether the terminal is 201 or 202. First, a polling command is issued from the TCE 100 to, e.g., the terminal 201, and information retrieval or polling is effected for checking to see if a there is a request from the terminal 201. In the case where a plurality of terminals are connected to the TCE, a polling command is issued in such a way as to scan the terminals sequentially. Requests from a terminal include a request for transfer for iPL data, a keyboard attention request when the terminal has a keyboard as a device, or an error status request etc. Regardless of the kind of a request, when there is a request from the terminal, a signal representing the presence of a request is returned. Then the TCE carries out status-read to the terminal where the request is found in order to identify the type of the request. As mentioned above, as kinds of request from the terminal there are several statuses. Each time a status changes, the prevailing status is written at a certain address of the RAM 91 by the control of, e.g., the microprocessor 81. Also, in order to identify what kind of function the terminal 201 has, a terminal identification code is written at a certain address of the RAM 91. The status such as an iPL request and the terminal identification code are read out from the RAM 91 and is returned to the TCE 100 through the data bus 101, the TCE adaptor 71 and the cable 103. Among the requests from the terminals, the iPL transfer request is determined to be effective in the embodiment under consideration. The kind of request transferred from the terminal and the terminal identification code are decoded by the microprocessor 6 of the TCE 100.

Figure 3:
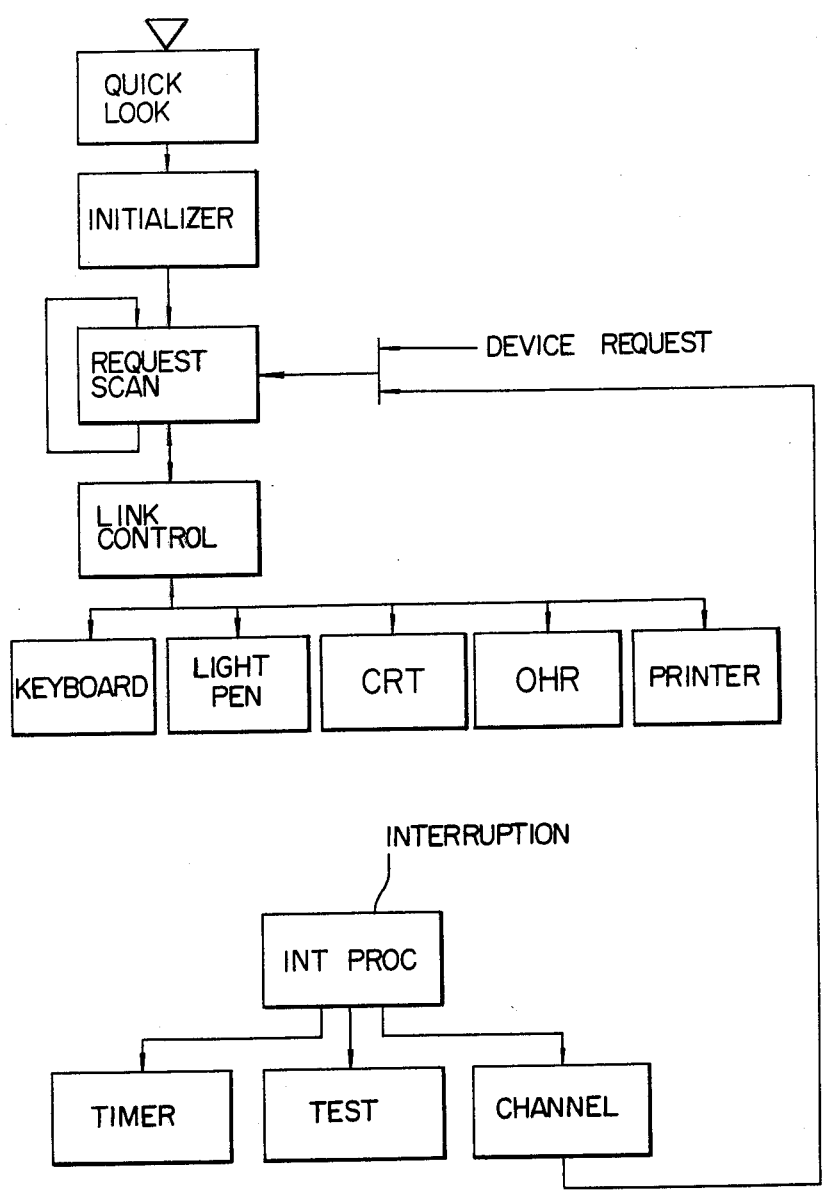
FIG. 3 is a diagram showing a module construction of a command/word.

A basic program for iPL data and a plurality of patch data are stored in the ROM 4 of the TCE 100. The basic program is one for basic control substantially common to the terminals, and the process flow of the program is shown in FIG. 3. This will be described later. The patch data is one for carrying out control which is required in accordance with a function change of the terminals when there has occurred some change in function of the terminals. The patch data include, for instance, those for clearing the display screen of the CRT, changing the device address in the terminal, changing the wavelength of the alarm caused at the time of depression of the keyboard or changing the wavelength of a buzzer alarm on an input error from the keyboard etc. To the function change at the terminals, the terminal identification code stated above indicates the substance of function change as to how the function of the terminal is changed. In other words, the terminal identification code indicates what kind of patch data is required for the function change at the corresponding terminal.

The microprocessor 6 in the TCE 100, upon deciding that the kind of the request is for transfer request of the iPL data and upon decoding of the terminal identification code, reads out the basic program from the ROM 4 as an iPL data, and selects necessary patch data. The basic program and the patch data are transmitted from the ROM 4 to the terminal 201 as iPL data through the data bus 3, the terminal adaptor 5, and the cable 103, and is stored in the RAM 91 through the TCE adapter 71 and the data bus 101. The storage areas of the ROM 111 and the RAM 91 at the terminal 201 are shown in detail in FIG. 4.

When the iPL data is stored in the RAM 91, an iPL end signal is returned from the terminal 201 to the TCE 100 under the control of the microprocessor 81. Then the TCE 100 issues a polling command to the terminal 201 and carries out information retrieval.

On the other hand, the iPL data stored in the RAM 91 is checked for an error (such as a CRC check), and by the following patch data the processing such as the change of the iPL data is carried out. If the above-mentioned polling command arrives to the terminal 201 during the error check or patch processing, a signal indicative that the terminal is being initialized is returned. Then, until an answer indicative of the presence of a request is received by the TCE 100, the TCE 100 sequentially issues polling commands to the terminal 201. Upon completion of the checking of the iPL data, the normal processing is started at the terminal.

Now, explanation will be made of the functions and processing of the iPL data as a basic program with reference to FIG. 3.

When power is thrown in for a terminal, e.g., the terminal 201, the initial test of the terminal 201 is conducted and the iPL data is loaded from the ROM 4 of the TCE 100 by the microprogram stored in the ROM 111. The iPL data thus loaded is stored in the RAM 91 as mentioned above. This processing is called here a Quick lock. Then each adaptor of the terminal 201 such as the CRT adaptor 121 is initialized, and the request from the device connected to the adaptor 121 such as the CRT 131 is awaited. For this purpose, the microprocessor 81 of the terminal 201 carries out request-scan of the adaptors to receive requests from the devices. By this request-scan, a request from a device or an interruption request mentioned later is received. Next, a link control is made. Normally, the adaptor of a terminal is connected with such a device as a well-known keyboard, a light pen, a CRT, an OHR or a printer. The iPL data includes microprograms for controlling these devices. Since the adaptor 121 of the terminal 201 is, of course, connected with only the CRT 131, the control data for the devices other than the CRT in the iPL data are made unnecessary data.

By a request scan to the devices, an interruption request from the devices is received. This interruption includes a timer interruption, a test interruption or a channel interruption etc. The kind of interruption is determined by an interrupt program, and the interruption request thus determined is received by the request scan as an interruption from a device.

Now, explanation will be made of the storage construction of the ROM and the RAM at the terminals with reference to FIG. 4. The storage construction of the ROM and the RAM at the terminals does not differ basically by the difference of the terminals, therefore, explanation will be made taking the terminal 202 as an example.

A sequential address is given from the top address of the ROM 112 to the last address of the RAM 92. The ROM 112 stores, as mentioned above, a microprogram for conducting the initial test of the terminals and loading of the iPL data. From the address next to the last address of the ROM 112, that is, the address B of the RAM 92 to the address C-1 the iPL data loaded from the ROM 4 of the TCE 100, namely, the commands of the basic program are stored. This basic program contains a control program for controlling some devices as mentioned with reference to FIG. 3, but it is possible that a device such as an I/O A1 or I/O A2 etc. other than the devices predetermined initially are connected at some terminals as an option. In this case, a program for controlling the devices I/O A1 and I/O A2, further to the basic program, is loaded from the ROM 4 of the TCE 100. These commands are stored at addresses C to D-1 and from D to E-1 of the RAM 92.

In the case where the terminal 202 is connected with the CRT 132, on the other hand, what is called a picture screen memory for storing a display character code or the like is required to be secured corresponding to the display picture screen of the CRT. As this picture screen memory, a display area is secured for storing the display character code from the addresses E to F-1 of the random access memory 92. In other words, the picture to be transferred to the display area for each terminal is edited by the microprocessor of the TCE 100, and then the picture is transferred to the terminal and is stored in the corresponding area of the RAM 92.

The patch data transferred from the TCE 100 as mentioned above is stored at the addresses F to G-1 of the RAM 92. The number of patch data for changing or adding the iPL data is not of course limited to one, but areas of the ROM 92 are generally secured to store a plurality of patch data. That is, the patch data may be stored at addresses after the address G. At the vacant areas after the address G of the RAM 92 other data such as the present status of the terminal 202 as mentioned above and the terminal identification code etc. are set sequentially.

The operation in the case in which the terminal does not require modification of the basic program (FIG. 5) and that in the case in which the terminal requires the change thereof (FIG. 6) will be described with reference to FIGS. 5 and 6 respectively. For facilitating the understanding, it is assumed that the terminal 201 shown in FIG. 1 does not require a change or modification, while the terminal 202 requires a change. First, with reference to FIG. 5, the modification of the basic program by the patch code is not carried out for the terminal 201. Accordingly, when loading the iPL data from the TCE 100 to the terminal 201, the basic program in the ROM 4 is loaded to the terminal 201 but the patch data is not loaded. As a result, the patch data is not stored in the RAM 91 in the terminal 201. Upon completion of the operation of loading the basic program to the terminal 201, control is transferred to the basic program thus loaded. That is, the data processing for devices such as the CRT 131 etc. is peformed by the microprocessor under the control of the basic program.

Now, with reference to FIG. 6, explanation will be made about the case in which the basic program is required to be modified at the terminal 202. In such a case, not only the basic program but also the required patch data are loaded at the terminal 202 from the TCE 100, while the basic program (base c/w) and the patch data (patch c/w) as shown in FIG. 4 are stored in the RAM 92. Subsequently, the basic program is modified by this patch data and the function of the terminal 202 is modified to some degree. Upon completion of the modification of the basic program, the basic program thus modified is temporarily stored in the RAM 92, and by this program the devices such as the OHR 7 and the CRT 132 in the terminal 202 are controlled subsequently.

The modification of the basic program will be explained with reference to FIG. 7. Assume that the CRT 131 controlled by the basic program is one in which the display screen is not cleared once when switching the information to be displayed on the display screen to other information to be displayed. It is also assumed that this is controlled by the basic program of FIG. 7(a). As compared with the CRT 131, the CRT 132 is one which is such that the function thereof is partly modified, and after clearing the data on the display screen once, new display data is written in the display area of the RAM 92 and is displayed on the CRT 132. For this modification of the function, the patch data shown in (c) is selected from the ROM 4 of the TCE 100, transferred to the terminal 202, and is stored in the address EXA of the RAM 92. In the processing routine of the basic program, on the other hand, a call instruction (or a jump instruction) is inserted at the address EXi of the step of changing the function of the CRT 132. By this call instruction, the program processing jumps to the address EXA storing the patch data, and the contents of the patch data are processed. The patch data contains a processing command for temporarily clearing the information which has been displayed at the time point of changing the display data of the CRT 132, and thereby the processing of the functions as mentioned above is carried out. Upon completion of this processing, the program processing returns again to the processing routine of the basic program. In this way, by means of the patch data modification of the display function of the terminal 202, or more specifically, the CRT 132 is carried out. By the program thus modified, the terminal 202 is controlled.

From the foregoing description, it will be understood that according to the embodiments of the present invention, a basic program is provided in the ROM 4 of the TCE 100 as a common program for controlling a plurality of terminals, while a plural number n of patch data corresponding to a plurality of modification statuses, which can be considered beforehand, for modifying the function of terminals, are provided, so that in accordance with a request from a terminal, a required patch data is selected and is transferred to the terminal, thus modifying the basic program by the patch data. By the program thus modified various kinds of devices in a terminal are controlled. That is, it can be understood that, the modification of the control function of a device is carried out by the patch data.

The present invention has been described above with reference to an embodiment, and may be embodied in various modifications not limited to the above embodiment. For example, the above-described embodiment is so constructed that the TCE 100 selects a patch data to be transferred to a terminal. As an alternative to this method, it may be constructed such that all the patch data in the ROM 4 of the terminal control equipment 100 may be transferred to the terminal where there is a request and make the terminal to select a necessary patch data on the basis of a terminal identification code.

What is claimed is:

1. A terminal processing system for process control comprising:
   at least a first terminal including a first memory;
   a terminal control device including a second memory, wherein said second memory is programmed to store a first predetermined program including instructions for performing a first set of predetermined operations at said first terminal and a second predetermined program including instructions for modifying said first program to make predetermined changes to the first set of predetermined operations at said first terminal;
   means coupled to said terminal control device for selecting a first portion of said second predetermined program which is to be utilized by said first terminal for modifying said first set of predetermined operations at said first terminal in a predetermined manner; and
   means for transferring said first program and only said first portion of said second program determined by said selecting means from said second memory in said terminal control device to said first memory in said first terminal.

2. A terminal processing system for process control comprising:
   at least a first terminal including a first memory;
   a terminal control device including a second memory, wherein said second memory is programmed to store a first predetermined program including instructions for performing a first set of predetermined operations at said first terminal and a second predetermined program including instructions for modifying said first program to make predetermined changes to the first set of predetermined operations at said first terminal;
   means for transferring said first program and said second program from said second memory in said terminal control device to said first memory in said first terminal; and
   means coupled to said first terminal for selecting a first portion of said predetermined program which is to be utilized by said first terminal for modifying said first set of predetermined operations at said first terminal in a predetermined manner.

3. A terminal processing system according to claim 1, wherein said first terminal further includes means for processing data received by said first terminal in accordance with the first set of predetermined operations as modified by said selected first portion of said second program.

4. A terminal processing system according to claim 2, wherein said first terminal further includes means for processing data received by said first terminal in accordance with the first set of predetermined operations as modified by said selected first portion of said second program.

5. A terminal processing system according to claim 1, further comprising:
   a second terminal including a third memory,
   wherein said selecting means includes means for selecting a second portion of said second predetermined program which is to be utilized by said second terminal for modifying said first set of predetermined operations at said second terminal in a predetermined manner which is different than the modification of said first set of predetermined operations to be performed at said first terminal, and
   wherein said transferring means includes means for transferring said first program and only said second portion of said second program from said second memory of said terminal control device to said third memory of said second terminal.

6. A terminal processing system according to claim 2, further comprising:
   a second terminal including a third memory,
   wherein said transferring means includes means for transferring said first program and said second program from said second memory of said terminal control device to said third memory in said second terminal, and
   wherein said selecting means includes means coupled to said second terminal for selecting a second portion of said second predetermined program which is to be utilized by said second terminal for modifying said first set of predetermined operations at said second terminal in a predetermined manner different than the modification of said first set of predetermined operations to be performed at said first terminal.

7. A terminal processing system for process control comprising:
   at least a first terminal including a first memory and a second terminal including a second memory;
   a terminal control device including a third memory, wherein said third memory is programmed to store a first predetermined program including instructions for performing a first set of predetermined operations at said first and second terminals and a second predetermined program including instructions for modifying said first program to make predetermined changes to the first set of predetermined operations at said second terminal;
   means coupled to said terminal control device for selecting a first portion of said second predetermined program which is to be utilized by said second terminal for modifying said first set of predetermined operations at said second terminal in a predetermined manner; and
   means for transferring only said first program from said third memory in said terminal control device to said first memory in said first terminal and for transferring said first program and only said first portion of said second program determined by said selecting means from said third memory in said terminal control device to said second memory in said second terminal.

8. A terminal processing system for process control comprising:
   at least a first terminal including a first memory and a second terminal including a second memory;
   a terminal control device including a third memory, wherein said third memory is programmed to store a first predetermined program including instructions for performing a first set of predetermined operations at said first and second terminals and a second predetermined program including instructions for modifying said first program to make predetermined changes to the first set of predetermined operations at said second terminal;
   means for transferring said first program and said second program from said third memory in said terminal control device to said first memory in said first terminal and to said second memory in said second terminal; and
   means coupled to said second terminal for selecting a first portion of said second predetermined program which is to be utilized by said second terminal for modifying said first set of predetermined operations at said second terminal in a predetermined manner.

9. A terminal processing system according to claim 7, wherein said first terminal includes means for processing data received by said first termnal in accordance with the first set of predetermined operations, and wherein said second terminal includes means for processing data received by said second terminal in accordance with a first set of predetermined operations as modified by said selected first portion of said second predetermined program.

10. A terminal processing system according to claim 8, wherein said first terminal includes means for processing data received by said first terminal in accordance with the first set of predetermined operations, and wherein said second terminal includes means for processing data received by said second terminal in accordance with the first set of predetermined operations as modified by said selected first portion of said second predetermined program.

11. A terminal processing system according to claim 7, wherein said system further comprises:
   a third terminal including a fourth memory,
   wherein said selecting means includes means for selecting a second portion of said second predetermined program which is to be utilized by said third terminal for modifying said first set of predetermined operations at said third terminal in a predetermined manner different than the modification of said first set of predetermined operations to be performed at said second terminal, and
   wherein said transferring means includes means for transferring said first program and only said second portion of said second program from said third memory of said terminal control device to said fourth memory of said third terminal.

12. A terminal processing system according to claim 8, further comprising:
   a third terminal including a fourth memory,
   wherein said transferring means includes means for transferring said first program and said second program from said third memory in said terminal control device to said fourth memory in said third terminal, and
   wherein said selecting means includes means coupled to said third terminal for selecting a second portion of said second predetermined program which is to be utilized by said third terminal for modifying said first set of predetermined operations at said third terminal in a predetermined manner different than the modification of said first set of predetermined operations to be performed at said second terminal.

13. A terminal processing system according to claim 1, wherein said selecting means includes means in said first terminal for requesting that said first portion of said second predetermined program be selected to be utilized by said first terminal for modifying said first set of predetermined operations at said first terminal in said predetermined manner.

14. A terminal processing system according to claim 2, wherein said selecting means includes means in said first terminal for requesting that said first portion of said second predetermined program be selected to be utilized by said first terminal for modifying said first set of predetermined operations at said first terminal in said predetermined manner.

15. A terminal processing system according to claim 5, wherein said selecting means includes means in said first terminal for requesting that said first portion of said second predetermined program be selected to be utilized at said first terminal for modifying said first set of predetermined operations at said first terminal in said predetermined manner and means in said second terminal for requesting that said second portion of said second predetermined program be selected to be utilized by said second terminal for modifying said first set of predetermined operations at said first terminal in said predetermined manner.

16. A terminal processing system according to claim 6, wherein said selecting means includes means in said first terminal for requesting that said first portion of said second predetermined program be selected to be utilized at said first terminal for modifying said first set of predetermined operations at said first terminal in said predetermined manner and means in said second terminal for requesting that said second portion of said second predetermined program be selected to be utilized by said second terminal for modifying said first set of predetermined operations at said first terminal in said predetermined manner.

17. A terminal processing system according to claim 7, wherein said selecting means includes means in said second terminal for requesting that said first portion of said second predetermined program be selected to be utilized by said second terminal for modifying said first set of predetermined operations at said second terminal in said predetermined manner.

18. A terminal processing system according to claim 8, wherein said selecting means includes means in said second terminal for requesting that said first portion of said second predetermined program be selected to be utilized by said second terminal for modifying said first set of predetermined operations at said second terminal in said predetermined manner.

19. In a terminal processing system for process control including at least a first terminal having a first memory and a terminal control device having a second memory, a method comprising:
   programming said second memory to store a first predetermined program including instructions for performing a first set of predetermined operations at said first terminal and a second predetermined program including instructions for modifying said first program to make predetermined changes to the first set of predetermined operations at said first terminal;

selecting at said terminal control device a first portion of said second predetermined program which is to be utilized by said first terminal for modifying said first set of predetermined operations at said first terminal in a predetermined manner; and transferring said first program and only said selected first portion of said second program from said second memory in said terminal control device to said first memory in said first terminal.

20. In a terminal processing system for process control including at least a first terminal having a first memory and a terminal control device having a second memory, a method comprising:

programming said second memory to store a first predetermined program including instructions for performing a first set of predetermined operations at said first terminal and a second predetermined program including instructions for modifying said first program to make predetermined changes to the first set of predetermined operations at said first terminal;

transferring said first program and said second program from said second memory in said terminal control device to said first memory in said first terminal; and selecting at said first terminal a first portion of said second predetermined program which is to be utilized by said first terminal for modifying said first set of predetermined operations at said first terminal in a predetermined manner.

21. A method according to claim 19, wherein said terminal processing system further includes a second terminal including a third memory, said method further comprising:

selecting at said terminal control device a second portion of said second predetermined program which is to be utilized by said second terminal for modifying said first set of predetermined operations at said second terminal in a predetermined manner which is different than the modification of said first set of predetermined operations to be performed at said first terminal; and transferring said first program and only said second portion of said second program from said second memory of said terminal control device to said third memory of said second terminal.

22. A method according to claim 20, wherein said terminal processing system further includes a second terminal including a third memory, said method further comprising:

transferring said first program and said second program from said second memory of said terminal control device to said third memory in said second terminal; and selecting at said second terminal a second portion of said second predetermined program which is to be utilized by said second terminal for modifying said first set of predetermined operations at said second terminal in a predetermined manner different than the modification of said first set of predetermined operations to be performed at said first terminal.

23. In a terminal processing system for process control including at least a first terminal having a first memory, a second terminal including a second memory, and a terminal control device including a third memory, a method comprising:

programming said third memory to store a first predetermined program including instructions for performing a first set of predetermined operations at said first and second terminals and a second predetermined program including instructions for modifying said first program to make predetermined changes to the first set of predetermined operations at said second terminal;

selecting at said terminal control device a first portion of said second predetermined program which is to be utilized by said second terminal for modifying said first set of predetermined operations at said second terminal in a predetermined manner; and transferring only said first program from said third memory in said terminal control device to said first memory in said first terminal and transferring said first program and only said selected first portion of said second program from said third memory in said terminal control device to said second memory in said second terminal.

24. In a terminal processing system for process control including at least a first terminal having a first memory, a second terminal having a second memory, and a terminal control device including a third memory, a method comprising:

programming said third memory to store a first predetermined program including instructions for performing a first set of predetermined operations at said first and second terminals and a second predetermined program including instructions for modifying said first program to make predetermined changes to the first set of predetermined operations at said seocnd terminal;

transferring said first program and said second program from said third memory in said terminal control device to said first memory in said first terminal and to said second memory in said second terminal; and selecting at said second terminal a first portion of said second predetermined program which is to be utilized by said second terminal for modifying said first set of predetermined operations at said second terminal in a predetermined manner.

25. A method according to claim 23, wherein said terminal processing system further includes a third terminal including a fourth memory, said method further comprising:

selecting at said terminal control device a second portion of said second predetermined program which is to be utilized by said third terminal for modifying said first set of predetermined operations at said third terminal in a predetermined manner different than the modification of said first set of predetermined operations to be performed at said second terminal; and transferring said first program and only said second portion of said second program from said third memory of said terminal control device to said fourth memory of said third terminal.

26. A method according to claim 24, wherein said terminal processing system further includes a third terminal including a fourth memory, said method further comprising:

transferring said first program and said second program from said third memory in said terminal control device to said fourth memory in said third terminal; and selecting at said third terminal a second portion of said second predetermined program which is to be utilized by said third terminal for modifying said first set of predetermined operations at said third terminal in a predetermined manner different than the modification of said first set of predetermined operations to be performed at said second terminal.

* * * * *